United States Patent
DeMuth et al.

(10) Patent No.: US 10,376,987 B2
(45) Date of Patent: Aug. 13, 2019

(54) LASER PULSE SHAPING FOR ADDITIVE MANUFACTURING

(71) Applicant: LAWRENCE LIVERMORE NATIONAL SECURITY, LLC, Livermore, CA (US)

(72) Inventors: James A. DeMuth, Livermore, CA (US); Andrew J. Bayramian, Manteca, CA (US); Eric B. Duoss, Dublin, CA (US); Joshua D. Kuntz, Livermore, CA (US); Christopher M. Spadaccini, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 63 days.

(21) Appl. No.: 15/010,107

(22) Filed: Jan. 29, 2016

(65) Prior Publication Data

US 2017/0216966 A1 Aug. 3, 2017

(51) Int. Cl.
  *B22F 3/105* (2006.01)
  *B29C 64/20* (2017.01)
  (Continued)

(52) U.S. Cl.
  CPC .......... *B23K 26/066* (2015.10); *B22F 3/1055* (2013.01); *B23K 26/0622* (2015.10);
  (Continued)

(58) Field of Classification Search
  CPC ......... B33Y 40/00; B33Y 50/02; B33Y 70/00; B33Y 80/00; B23K 10/027;
  (Continued)

(56) References Cited

U.S. PATENT DOCUMENTS

| | | | | |
|---|---|---|---|---|
| 4,944,817 A | * | 7/1990 | Bourell | B22F 3/004 |
| | | | | 156/272.8 |
| 5,155,324 A | | 10/1992 | Deckard et al. | |

(Continued)

FOREIGN PATENT DOCUMENTS

| | | | | |
|---|---|---|---|---|
| WO | 2015-017077 | | 2/2015 | |
| WO | WO 2015108991 A2 | * | 7/2015 | ........... B23K 26/364 |
| WO | 2015-120168 | | 8/2015 | |

OTHER PUBLICATIONS

International Search Report for PCT/US17/012736, corresponding to U.S. Appl. No. 15/010,107, 13 pages.

*Primary Examiner* — Dana Ross
*Assistant Examiner* — Joe E Mills, Jr.
(74) *Attorney, Agent, or Firm* — Harness, Dickey & Pierce, PLC (57) ABSTRACT

A system for additive manufacturing uses a pulsed laser beam with one or more low flux components on the order of kW/cm$^2$, and one or more high flux components on the order of MW/cm$^2$ during the duration of the pulse. The pulsed laser beam is directed onto the powder particles on the substrate thereby melting the powder particles and melting the substrate at the interface layer between the powder and the substrate such that the powder particles bond to the substrate. This is accomplished by using low power (and low cost) lasers to do the majority of the energy transfer, and using high power (and higher cost) lasers to complete the melting process, overcoming the kinetics of powder agglomeration through surface tension forces by partially melting the powder-substrate interface layer before surface tension can take effect on the molten powder particles.

21 Claims, 7 Drawing Sheets

(51) Int. Cl.
*B33Y 10/00* (2015.01)
*B23K 26/066* (2014.01)
*B33Y 30/00* (2015.01)
*B23K 26/0622* (2014.01)
*B23K 26/342* (2014.01)
*B29C 64/153* (2017.01)
*B33Y 50/02* (2015.01)

(52) U.S. Cl.
CPC .......... *B23K 26/342* (2015.10); *B29C 64/153* (2017.08); *B29C 64/20* (2017.08); *B33Y 10/00* (2014.12); *B33Y 30/00* (2014.12); *B22F 2003/1056* (2013.01); *B33Y 50/02* (2014.12); *Y02P 10/295* (2015.11)

(58) Field of Classification Search
CPC .............. B23K 2203/08; B23K 26/042; B23K 26/0622; B23K 26/0643; B23K 26/702; B23K 26/082; B23K 26/34; B23K 26/342; B23K 26/0626; B29C 67/0077; B29C 41/12; C23C 24/10; C23C 24/08; C23C 26/02; B23P 6/007; B23P 15/02; B23P 6/00; G05B 2219/49013; G05B 2219/49018; B22D 23/06; C04B 35/64; F05D 2230/22; F05D 2230/31
USPC .............. 264/497, 113, 125, 642; 156/272.8; 164/250.1, 492, 494, 512, 80, 94; 219/121.64, 121.66, 121.8, 121.85; 419/1, 61, 78, 554, 556, 597; 700/118–120
See application file for complete search history.

(56) References Cited

U.S. PATENT DOCUMENTS

| | | | | | |
|---|---|---|---|---|---|
| 5,314,003 | A | * | 5/1994 | Mackay | B22D 23/06 |
| | | | | | 164/250.1 |
| 5,382,308 | A | * | 1/1995 | Bourell | B33Y 10/00 |
| | | | | | 156/272.8 |
| 5,640,667 | A | * | 6/1997 | Freitag | B22F 3/1055 |
| | | | | | 419/31 |
| 5,674,414 | A | * | 10/1997 | Schweizer | B23K 26/032 |
| | | | | | 219/121.74 |
| 2009/0221422 | A1 | * | 9/2009 | Miller | A61C 19/004 |
| | | | | | 503/201 |
| 2010/0176539 | A1 | * | 7/2010 | Higashi | B22F 3/1055 |
| | | | | | 264/497 |
| 2011/0019705 | A1 | * | 1/2011 | Adams | B23K 26/0622 |
| | | | | | 372/25 |
| 2011/0033887 | A1 | * | 2/2011 | Fang | B01L 3/502707 |
| | | | | | 435/41 |
| 2011/0278269 | A1 | * | 11/2011 | Gold | B23K 26/34 |
| | | | | | 219/121.69 |
| 2013/0102447 | A1 | * | 4/2013 | Strong | B65D 5/029 |
| | | | | | 493/105 |
| 2013/0136868 | A1 | * | 5/2013 | Bruck | B05D 3/06 |
| | | | | | 427/554 |
| 2013/0271800 | A1 | * | 10/2013 | Kanugo | G03H 1/2294 |
| | | | | | 359/9 |
| 2013/0300286 | A1 | * | 11/2013 | Ljungblad | H01J 29/52 |
| | | | | | 315/30 |
| 2013/0302533 | A1 | * | 11/2013 | Bruck | F01D 5/005 |
| | | | | | 427/554 |
| 2014/0085631 | A1 | * | 3/2014 | Lacour | G01J 3/0208 |
| | | | | | 356/316 |
| 2014/0252687 | A1 | * | 9/2014 | El-Dasher | B29C 67/0077 |
| | | | | | 264/497 |
| 2014/0271965 | A1 | * | 9/2014 | Ferrar | B29C 67/0077 |
| | | | | | 425/163 |
| 2014/0367894 | A1 | * | 12/2014 | Kramer | C04B 35/522 |
| | | | | | 264/482 |
| 2015/0132173 | A1 | * | 5/2015 | Bruck | B23K 26/702 |
| | | | | | 419/1 |
| 2015/0211083 | A1 | * | 7/2015 | Gabilondo | B23K 26/0823 |
| | | | | | 700/166 |
| 2015/0273632 | A1 | * | 10/2015 | Chen | B33Y 10/00 |
| | | | | | 219/76.1 |
| 2015/0283614 | A1 | * | 10/2015 | Wu | B22F 3/1055 |
| | | | | | 419/42 |
| 2015/0311064 | A1 | * | 10/2015 | Stuart | H01S 3/08095 |
| | | | | | 438/584 |
| 2015/0343664 | A1 | * | 12/2015 | Liu | B28B 1/001 |
| | | | | | 419/1 |
| 2015/0360418 | A1 | * | 12/2015 | Shah | B29C 67/0081 |
| | | | | | 264/489 |
| 2016/0175935 | A1 | * | 6/2016 | Ladewig | B22F 7/02 |
| | | | | | 425/78 |
| 2016/0236279 | A1 | * | 8/2016 | Ashton | B22F 3/1055 |
| 2016/0322777 | A1 | * | 11/2016 | Zediker | H01S 5/4012 |
| 2017/0144371 | A1 | * | 5/2017 | Lussier | B29C 67/0077 |

* cited by examiner

LASER PULSE SHAPING FOR ADDITIVE MANUFACTURING

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

CROSS-REFERENCE TO RELATED APPLICATIONS

Related disclosure is included in U.S. patent application Ser. No. 14/882,762 entitled "spatter reduction laser scanning strategy in selective laser melting" filed Oct. 14, 2015. The disclosure of U.S. patent application Ser. No. 14/882,762 filed Oct. 14, 2015 and entitled "spatter reduction laser scanning strategy in selective laser melting" is hereby incorporated herein in its entirety for all purposes by this reference.

BACKGROUND

Field of Endeavor

The present application relates to the art of melting powdered material through laser pulse shaping, a technique which can be applied to additive manufacturing to create three-dimensional parts.

State of Technology

This section provides background information related to the present disclosure which is not necessarily prior art.

U.S. Pat. No. 4,944,817 for multiple material systems for selective beam sintering issued Jul. 31, 1990 to David L. Bourell et al and assigned to Board of Regents, The University of Texas System provides the state of technology information reproduced below.

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

U.S. Pat. No. 5,155,324 for a method for selective laser sintering with layerwise cross-scanning issued Oct. 12, 1992 to Carl R, Deckard et al, University of Texas at Austin, provides the state of technology information reproduced below.

Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype pails, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

United States Published Patent Application No. 2014/0252687 for a system and method for high power diode based additive manufacturing by Bassem S. El-Dasher; Andrew Bayramian; James A. Demuth; Joseph C. Farmer; and; Sharon G. Torres; published Sep. 11, 2014 and assigned to Lawrence Livermore National Security, LLC provides the state of technology information reproduced below.

A system is disclosed for performing an Additive Manufacturing (AM) fabrication process on a powdered material forming a substrate. The system may make use of a diode array for generating an optical signal sufficient to melt a powdered material of the substrate. A mask may be used for preventing a first predetermined portion of the optical signal from reaching the substrate, while allowing a second predetermined portion to reach the substrate. At least one processor may be used for controlling an output of the diode array.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, methods, and systems utilizes one or more pulsed lasers to melt and allow to re-solidify areas of powdered material by overcoming the kinetics of powder agglomeration through a pulse shape consisting of a low intensity portion and a high intensity portion by melting the powder, and partially melting the substrate at the interface surface between the powder and the substrate such that both the powder and the interface layer of the substrate have been melted before surface tension can take effect on the now molten powder particles. Without the proper temporal pulse profile, the powder particles would melt first, and then surface tension would pull them together into an unpatterned blob; however, by employing the inventor's apparatus, powder particles and the interface layer of the base substrate are melted before surface tension can take any detrimental effects, allowing for successful printing.

This process can be applied for the purposes of additive manufacturing, and can also enable the printing of large patterned areas of powder in single shot such as in Diode Additive Manufacturing (DiAM) and repeating the process to build up layers which constitute the part to be manufactured. The current embodiment of this invention has shown the ability in the laboratory to overcome the surface tension effects during the melting process and to create patterned images in a single laser shot.

Current powder bed fusion additive manufacturing systems (EOS, Concept Laser, etc. . . . ) use one or more 100-1,000 W lasers to melt layers of powdered material by scanning the laser over the substrate, melting the powder and bonding it to the base in a 2D pattern. A new layer of powder is then spread across the layer and a new arbitrary pattern is applied to the powder using the laser. These lasers are typically continuous wave systems, and thus are scanned around the build platform with some spot size, power, and velocity that is material dependent in order to achieve the correct melt characteristics.

The inventor's apparatus, methods, and systems produce entire layers (or macroscopic areas) in a single shot that are sub-patterned with hundreds to >millions of pixels. The inventor's apparatus, methods, and systems have the potential to dramatically decrease the cost to producing additively manufactured parts, enabling the move from prototyping/high value production to mass manufacturing.

One embodiment of the inventor's method for fusing large areas of layered powder into solid material and bonding it to a substrate includes the steps of providing a substrate, positioning a first layer of powder particles on said substrate producing a first interface between said first layer of powder particles and said substrate, producing a first data file defining a planar cross section of the first area to be printed, providing one or more lasers that either can be combined to produce a temporally varying bonding pulsed laser beam, providing a mask such as an optically addressed light valve that is transparent to said portion of said bonding pulsed laser beam, where the mask contains data from said first data file, and directing said bonding pulsed laser beam having a portion containing said first data file onto said first layer of powder particles on said substrate melting said first layer of powder particles and the said substrate at said interface to bond said first layer of powder particles to said substrate before surface tension can affect the printed image.

One embodiment of the inventor's additive manufacturing apparatus for fusing large areas of layered powder into solid material and bonding it to a substrate includes providing a substrate, positioning a first layer of powder particles on said substrate producing a first interface between said first layer of powder particles and said substrate, producing a first data file defining a planar cross section of the first area to be printed, providing one or more lasers that either can be combined to produce a temporally varying bonding pulsed laser beam, providing a mask such as an optically addressed light valve that is transparent to said portion of said bonding pulsed laser beam, where the mask contains data from said first data file, and directing said bonding pulsed laser beam having a portion containing said first data file onto said first layer of powder particles on said substrate, melting said first layer of powder particles and the said substrate at said interface to bond said first layer of powder particles to said substrate before surface tension can affect the printed image.

The inventor's apparatus, systems, and methods have a number of advantages. For example, they can perform laser printing of powder with much less spatter and produce more uniform melt. In the prior art systems spatter landing on a freshly consolidated melt track can form an incomplete weld with that surface. This can prevent a uniform powder spreading on top of the consolidated melt track. The outcome can be the creation of porosities, which is detrimental to the part quality.

The powder used in SLM is expensive. With the inventor's apparatus, systems, and methods spatter is minimized, the powder particle distribution will remain the same after multiple uses, hence, improving the re-use (recyclability) of the powder and minimizing waste.

Another advantage of the invention is to produce large macroscopic areas of fused material in a single shot. This has the ability to reduce thermally induced stress concentrations, and to reduce thermal warpage when additively manufacturing parts. Furthermore, by patterning a large beam for the purposes of additive manufacturing, the system is far more scalable than using a single point laser and scanning it to create the image, and production rates can be increased virtually without limit.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Additive manufacturing is changing the way the world makes things. It is on brink of being able to increase to production rates relative to mass manufacturing, but is still currently stuck in the prototyping/high-value-only product creation phase. There are many types of additive manufacturing, but one of the most precise systems that can handle the widest variety of materials (plastics, ceramics, and metals) is powder bed fusion (also known as DMLS, SLS, SLM, etc. . . . each company brands it with their own name, but the common method description is all powder bed fusion). Current powder bed fusion additive manufacturing systems (EOS, Concept Laser, etc. . . . ) use 100-1,000 W fiber lasers (typically 1-4) to melt layers of powdered material by scanning the laser over the substrate, melting the powder and bonding it to the base in a 2D pattern. A new layer of powder is the spread across the layer and a new arbitrary pattern is applied to the powder using the laser. These lasers are typically continuous wave systems, and thus are scanned around the build platform with some spot size, power, and velocity that is material dependent in order to achieve the correct melt characteristics.

The inventor's additive manufacturing system uses a temporally modulated laser beam to selectively fuse a layer of powder. One embodiment of this method is to produce a 3D printed part wherein the part comprises a plurality of fused layers. The system includes a computer controlling the output of one or more lasers such that a time varying photon flux illuminates the desired powder particles to successfully perform the melting operation, bonding the powder to the substrate beneath to produce a fused mass.

One embodiment of the invention uses low cost diode lasers to produce a low intensity (containing kilowatts of power) photon flux component over long duration (milliseconds), and a solid state Q-switched Nd:YLF laser to produce a high intensity component (containing milli-Joules to Joules of energy) over a short duration (microseconds to nanoseconds). By delivering the majority of the energy with diode lasers, the bulk of the laser light can be generated using a low cost photon source. Utilizing the higher intensity pulsed laser to deliver the final burst of energy, surface tension forces are able to be overcome to successfully melt the powder and bond it to the layer below.

The embodiment used to reduce this invention to practice consisted of a low intensity fluence (LIF) of 5.6 kW generated by diode lasers illuminating an area of 5 mm by 5 mm. The high intensity fluence (HIF) of <1 Joule was generated by a solid state Q-switched Nd:YLF laser co-linear with the diode laser beam. An optically addressed light valve (a type of mask) was used to create a pattern in both the LIF and HIF beams to create a 2D plane of melted metal in the desired pattern that was fused to the substrate below it. This fused mass includes consolidated material produced by the laser energy that passes through the area of the mask that is transparent to the laser diode beams. The portion of the fused mass that is left unconsolidated is that portion outside of the laser energy that passes through the transparent area of the mask. The unconsolidated material is that area untouched by the diode beams. The unconsolidated material corresponds to the area of the mask not transparent to the laser diode beam. The systems utilizes an optically addressed light valve (OALV) having first and second components. The first component represents the digital image of the first 2D layer and the second component represents the portion of the light beam that is outside of the digital image of the first 2D layer. The two components are directed to the light valve system that acts as a dynamic mask and allows the portion containing the digital image of the first 20 layer to pass while blocking the component that is outside of the digital image of the first 2D layer. In one embodiment, the mask comprises a controllable liquid crystal polarization rotator comprising a liquid crystal display (LCD) positioned upstream of a polarizing element, relative to a direction of travel of the laser energy.

Figure 1:
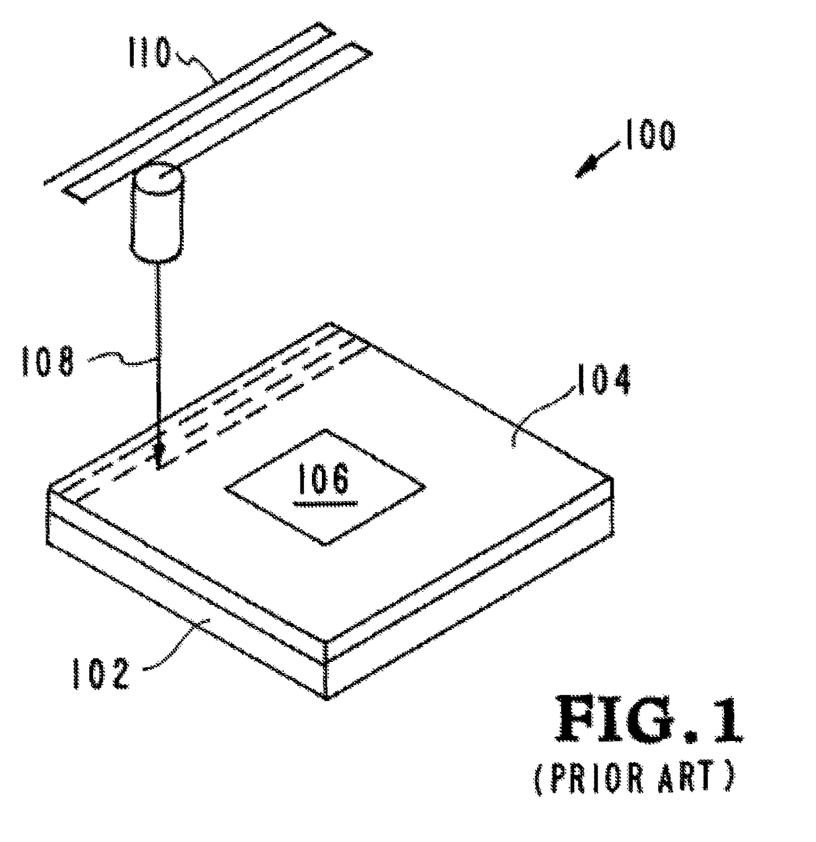
FIG. 1 illustrates a prior art additive manufacturing system.

Referring now to the drawings, and in particular to FIG. 1, a prior art additive manufacturing system is illustrated. The prior art additive manufacturing system is designated generally by the reference numeral 100. A print head directs a projected beam 108 onto metal powder particles 104 that have been deposited on a substrate 102. The print head and projected beam 108 move according to a predetermined raster pattern 110 that produces the consolidated mass of metal powder particles 104 according to the digital image of the first 2D layer. The projected beam 108 solidifies the metal powder particles 104 according to the digital image of the first 2D layer information. The portion 106 of the mass of metal powder particles outside of the consolidated mass of metal powder particles 104 is designated as the unconsolidated mass of metal powder particles 106.

Once the first layer of consolidated mass of metal powder particles 104 is completed, production of the second layer of the product is started. A second layer of metal powder particles is applied on top of the completed first layer 104.

This procedure is continued by repeating the steps and building the final product in a layer by layer process.

Figure 2A:
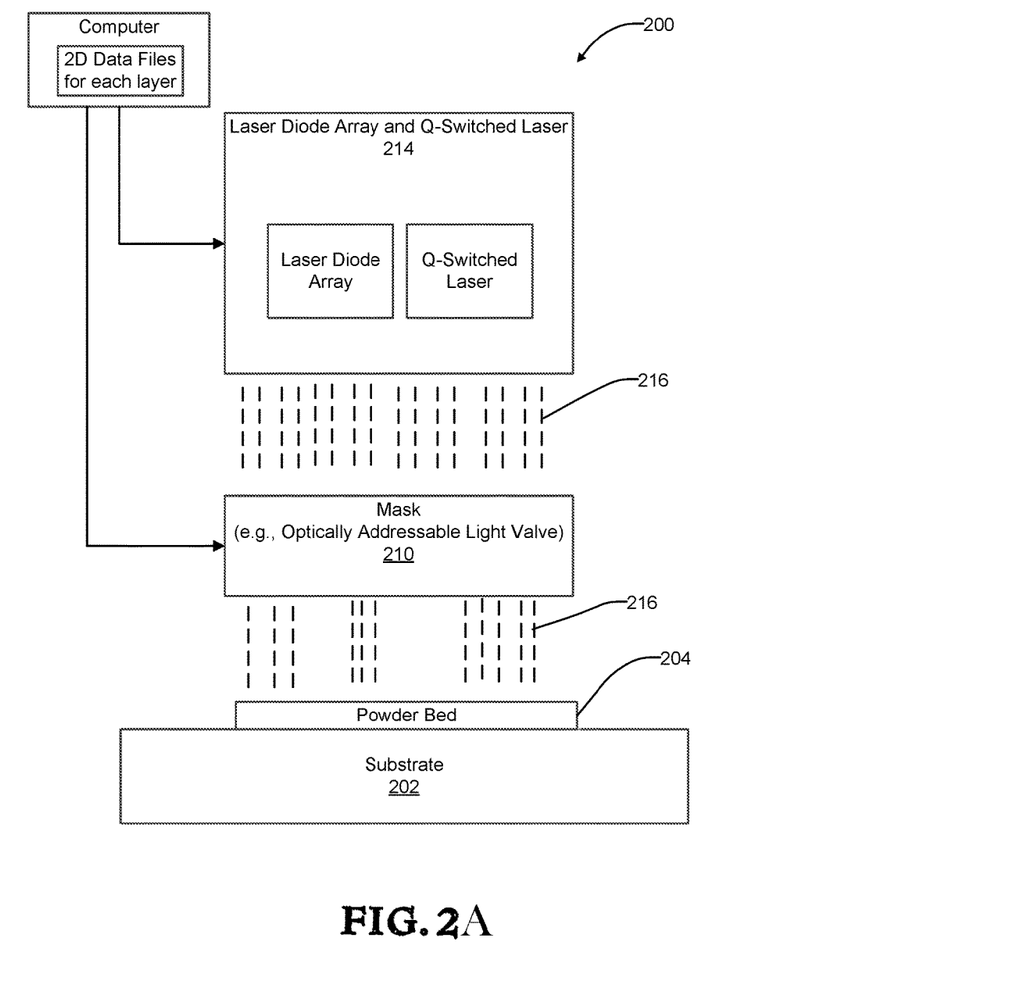
FIG. 2A is a high level block diagram of an example of one embodiment of a system in accordance with the present invention.
Figure 2B:
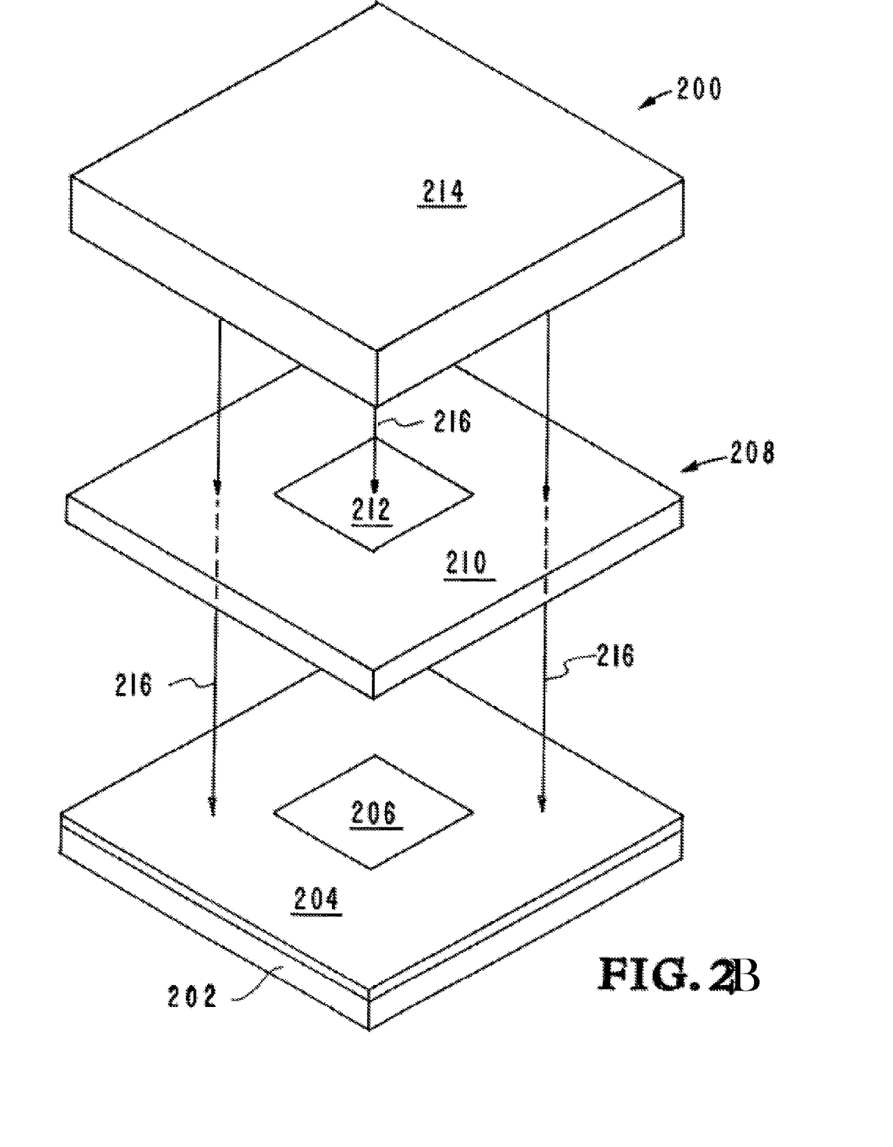
FIG. 2B further illustrates an embodiment of the inventor's additive manufacturing apparatus, systems, and methods from a spatial perspective.

Referring now to FIGS. 2A and 2B, an embodiment of the inventor's additive manufacturing apparatus, systems, and methods is illustrated. The embodiment is designated generally by the reference numeral 200. The embodiment 200 utilizes a pulsed laser to overcome the kinetics condition by delivering a pulse of laser energy before the powder is melted to allow it to bond to the base. Not only can the pulsed laser allow for the use of lower diode power fluxes, but it also allows for incredibly fine resolution to be achieved. Part resolution limits that are based on thermal diffusion in the powder bed scale with the time the energy is applied. The use of the solid state Q-switched laser provides nano-second time scales and can generate nanometer scale resolution. The embodiment 200 uses a diode pulse in milliseconds, followed by a short pulse from the Q-switched laser in nanoseconds. The embodiment 200 includes the components listed and described below.

Substrate 202.
First powder particles layer 204.
Unconsolidated material 206.
Selective area mask 208.
Optically addressed light valve (OALV) 210/212.
Area of Mask transparent to laser diode beams 210.
Area of Mask not transparent to laser diode beams 212.
Diode array and Q-switched laser 214.
Diode and Q-switched laser beam producing laser energy 216.

The embodiment 200 is an additive manufacturing system for selectively fusing a layer of powder to produce a part wherein the part comprises a plurality of fused layers. The system includes a computer controlling a laser diode array and Q-switched laser 214 to direct laser energy 216 onto powder in the powder bed to produce a fused mass. The fused mass includes consolidated material 204 produced by the laser energy 216 that passes through the area 210 of the mask that is transparent to the laser energy 216. The portion of the fused mass that is left unconsolidated 206 is that outside of the laser energy 216 that passes through the area 210 of the mask. The unconsolidated material 206 is that area untouched by the diode beams 216. The unconsolidated material 206 corresponds to the area 212 of the mask not transparent to laser diode beams 216. The embodiment 200 utilizes pulses from the diode array and Q-switched laser 214 to produce pulsed diode and Q-switched laser beams 216 that are delivered before the powder is melted to allow it to bond to the base.

The computer controller performs various operations of the system 200. Initially a 3D model of the desired product is designed by any suitable method, e.g., by bit mapping or by computer aided design (CAD) software at a PC/controller. The CAD model of the desired product is electronically sliced into series of 2-dimensional data files, i.e. 2D layers, each defining a planar cross section through the model of the desired product. The 2-dimensional data files are stored in a computer and provide a digital image of the final product.

The digital images are used in the additive manufacturing system 200 to produce the final product. Solidified powder particles are applied to a substrate in a layer by layer process to produce the final product. The digital image of the first 2D layer is used to produce the first layer of the desired product. The digital image of the first 2D layer is used to create a mask that only allows the desired portion of the laser beam to pass through the optically addressed light valve (OALV).

A delivery system directs metal powder particles onto substrate 202. The system 200 utilizes a pulse or pulses from the diode array and Q-switched laser 214 to produce a pulsed diode beam, and then later a Q-switched laser beam 216 that is delivered before the powder is fully melted by the diode lasers such that the first layer of powder particles and the first layer of the substrate 202 melt, and are bonded together. Additional layers of powder are then added onto the first layer and the process is repeated.

The system's computer either determines or is programmed with the boundaries of the desired cross-sectional regions of the part. For each cross-section, laser diode beam and Q-switched laser 216 is arranged to be projected onto a layer of powder particles and the beam 216 is switched on to fuse only the powder within the boundaries of the cross-section 204. Powder particles are applied and successive layers fused until a completed part is formed.

The system utilizes a light valve system (Optically addressed light valve (OALV) 210/212) producing the area 210 of the mask that is transparent to the laser energy 216 and producing the area 212 of the mask that rejects the laser energy 216.

The light valve system provides first and second components. The first component 216 represents the digital image of the first 2D layer and the second component 212 represents the portion of the light beam that is outside of the digital image of the first 2D layer. The two components are directed to the light valve system that acts as a dynamic mask and allows the portion containing the digital image of the first 2D layer to pass while rejecting the component that is outside of the digital image of the first 2D layer. Additional details of patterning high energy lasers, and the light valve system are provided in a patent application published as U.S. Published Patent Applications No. 2014/0252687 for system and method for high power diode based additive manufacturing. The disclosure of U.S. Published Patent Applications No. 2014/0252687 is incorporated herein by this reference.

The first layer 204 of powder particles is bonded to the substrate 202 by a bonding pulsed laser beam 216 (containing both diode laser and Q-switched laser beams) heating and melting the first layer 204 of powder particles and the substrate at the interface between the first layer 204 of powder particles and the substrate 202.

A diode laser beam 216 is incident on the light valve system 208 where the image to be printed is imbedded in the beam. The first 2D layer is then projected from the light valve system onto the layer 204 of metal powder particles that has been deposited on the substrate 202. The projected diode laser beam 216 heats up the metal powder particles in a pattern according to the digital image of the first 2D layer information, bringing the patterned image up close to the melting point of the powdered material.

A q-switched pulsed laser beam 216 is incident on the light valve system 208 where the image to be printed is imbedded in the beam. The first 2D layer is then projected from the light valve system onto the layer 204 of metal powder particles that has been deposited on the substrate 202. The projected q-switched laser beam 216 provides the remaining energy required to melt the metal powder particles and the interface layer of the substrate 202 in a pattern according to the digital image of the first 2D layer information, melting the powder forming the patterned image and the substrate below it.

Once the first layer 204 is completed, production of the second layer of the product is started. A second layer of metal powder particles is applied on top of the competed first layer 204. The second layer of powder particles is bonded to the first layer 204 of the product by a bonding pulsed laser beam heating and melting the second layer of powder particles and melting the first layer 204 at the interface between the second layer of powder particles and the first layer 204.

Figure 3:
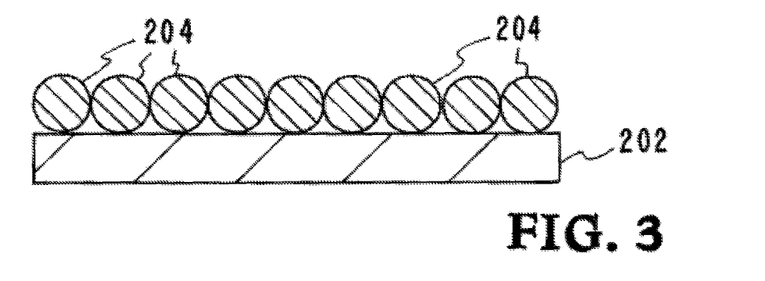
FIG. 3 shows a first layer of powder particles applied to the substrate with an interface between the first layer of powder particles and the substrate.

The inventor's apparatus, systems, and methods utilize time dependent shaping of the laser pulse to overcome a kinetics barrier in the physics of powder melting in order to bond the powder to the base. One embodiment of the invention is as used in the additive manufacturing processes to construct nearly any material that can be melted and some that cannot (like some ceramics) but that the heating process allows them to fuse. The pulsed laser can deliver the required energy either before, during, or after powder melting, but in all cases before the surface tension forces of the molten powder can distort the printed image by pulling the molten powder together to lower the total surface energy. The additive manufacturing system begins with a layer of powder being spread across the substrate. As illustrated in FIG. 3, the first layer of powder particles 204 are applied to substrate 202. The inventor found that the condition existed where the powder particles 204 would melt and ball up but not bond to the substrate 202 if the laser flux was not high enough. The inventor discovered that by using a correctly shaped pulsed laser beam, the effect of surface tension forces on the molten particles could be overcome by delivering an additional pulse of laser energy before the powder particles 204 were fully melted to allow the powder particles 204 to be melted at the interface between the particles and substrate thereby bonding the particles 204 to the substrate 202.

Figure 4:
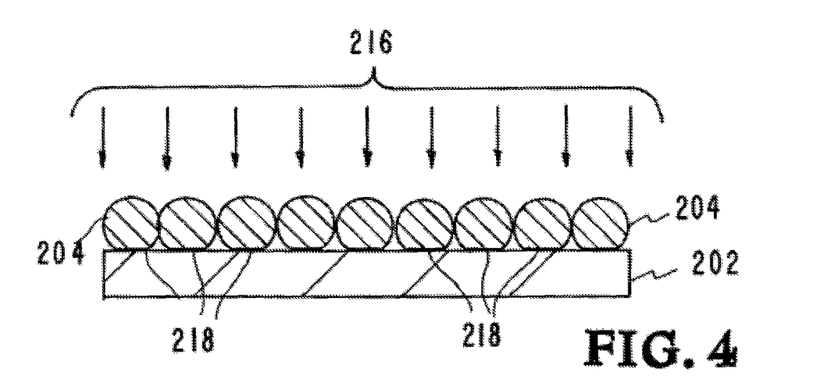
FIG. 4 shows a bonding laser beam heating and melting the first layer of powder particles and melting the substrate at the interface between the first layer of powder particles and the substrate.

Referring now to FIG. 4, a pulsed diode laser beam 216 is shown heating and melting the first layer of powder particles 204, but not melting the substrate 202 at interface 218.

Figure 5:
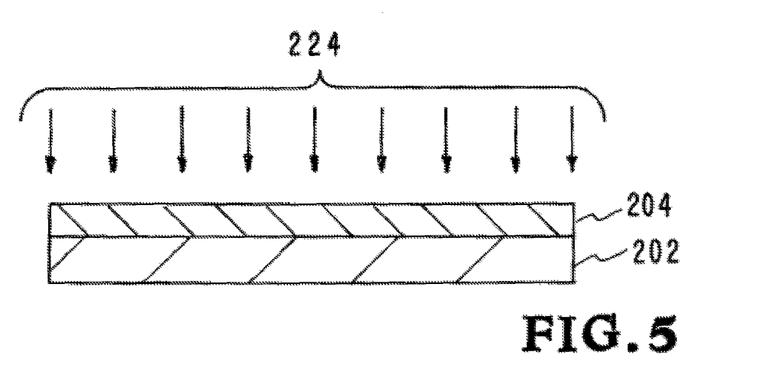
FIG. 5 shows a laser beam heating the first layer of now melted powder particles to form the first layer of the product.

Referring now to FIG. 5 an additional q-switched pulsed laser beam 224 with ns duration containing MW of power, is shown heating the first layer of powder particles and delivering sufficient energy to melt the first layer of powder particles and the interface layer 218 of FIG. 4 such that the melted particles adhere to the substrate layer 202 to form the first layer 204 of the product that has been bonded to the substrate 202.

Figure 6:
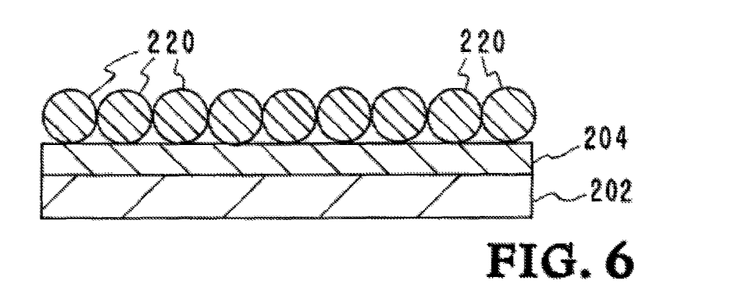
FIG. 6 shows a second layer of powder particles applied to the first layer of the product with an interface between the second layer of powder particles and the first solidified layer previously consisting of powder particles.

Once the first layer 204 is completed production of the second layer of the product is started. As illustrated in FIG. 6, a second layer of powder particles 220 are applied to the first layer 204 of the product with an interface between the second layer of powder particles 220 and the first layer 204 of the product.

Figure 7:
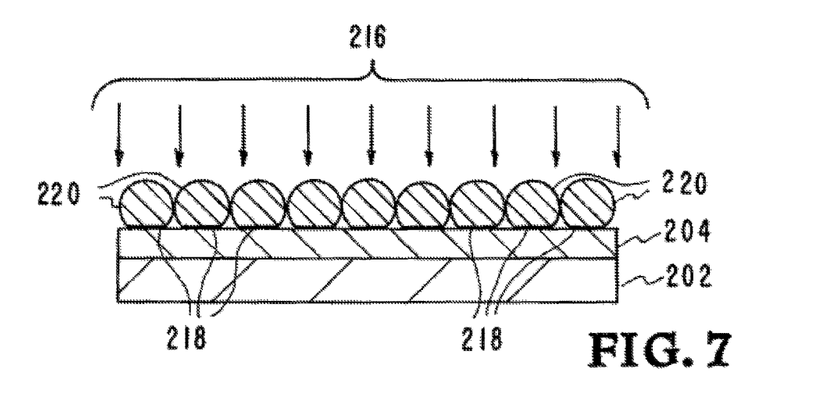
FIG. 7 shows a bonding laser beam heating and melting the second layer of powder particles and melting the first layer of the product at the interface between the second layer of powder particles and the first layer of the product.

Referring now to FIG. 7, a pulsed diode laser beam 216 is shown heating and melting the second layer of powder particles 220, but not melting the first layer 204 at interface 218.

Figure 8:
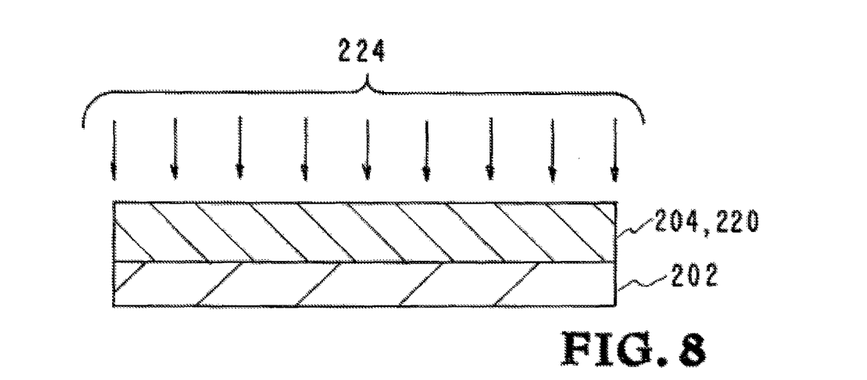
FIG. 8 shows a laser beam heating the second layer of now melted powder particles to form the second layer of the product.

Referring now to FIG. 8, an additional q-switched pulsed laser beam 224 with ns duration containing MW of power, is shown heating the first layer 204 of powder particles and delivering sufficient energy to melt the first layer of powder particles and the interface layer 218 of FIG. 7 such that the melted particles adhere to the first layer 204 to form the first layer 220 of the product that has been bonded to the substrate 202.

The inventors' apparatus, systems, and methods provide an additive manufacturing pulsed laser that enables the printing of large areas of powder in single shot either by itself or in conjunction with another laser, overcoming the kinetics of powder agglomeration by shaping of the laser pulse enabling melting of the base substrate before surface tension can take effect. The system utilizes a mask such as an optically addressed light valve (OALV) having first mask and second mask components. The fused mass includes consolidated material produced by the laser energy that passes through the first mask component area of the mask that is transparent to the laser diode beams. The portion of the fused mass that is left unconsolidated is that outside of the laser energy that passes through the second mask component area of the mask.

Figure 9:
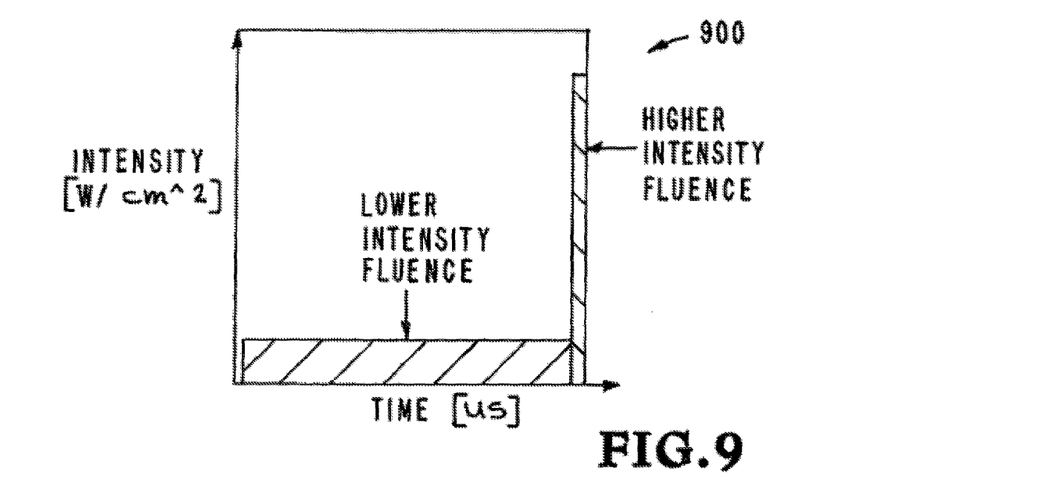
FIG. 9 is a graph illustrating an embodiment of the inventor's additive manufacturing apparatus, systems, and methods from a temporal perspective.

Referring now to FIG. 9 a graph illustrates an embodiment of the inventor's additive manufacturing apparatus, systems, and methods. The graph is designated generally by the reference numeral 900. The inventor's additive manufacturing apparatus, systems, and methods use a temporally modulated laser beam to selectively fuse a layer of powder. The graph 900 illustrates the inventors' system from a temporal perspective where the pulses in superposition are synced at their end points.

Figure 10:
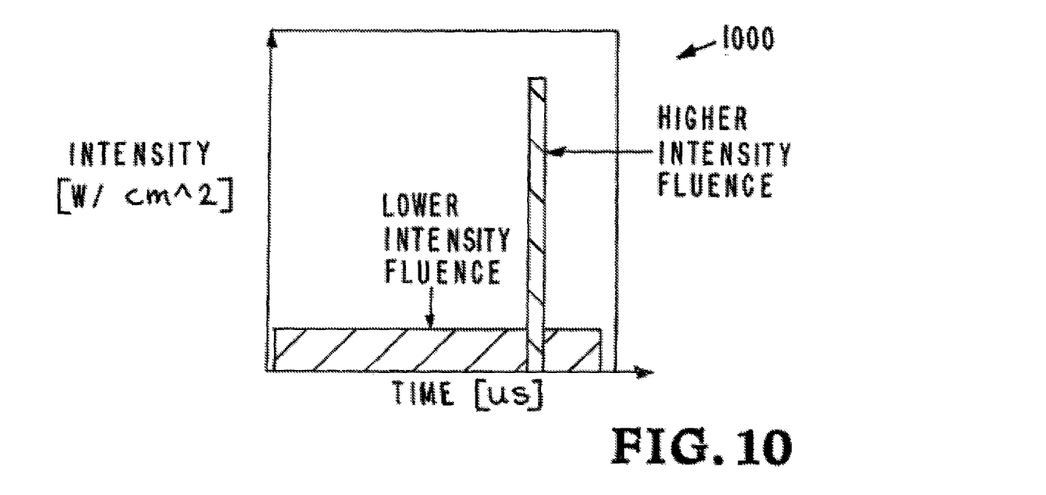
FIG. 10 is a graph illustrating another embodiment of the inventor's additive manufacturing apparatus, systems, and methods from a temporal perspective.

Referring now to FIG. 10 a graph illustrates another embodiment of the inventor's additive manufacturing apparatus, systems, and methods. The graph is designated generally by the reference numeral 1000. The inventor's additive manufacturing apparatus, systems, and methods use a temporally modulated laser beam to selectively fuse a layer of powder. The graph 1000 illustrates the inventors' system from a temporal perspective where the pulses in superposition are overlapped.

Figure 11:
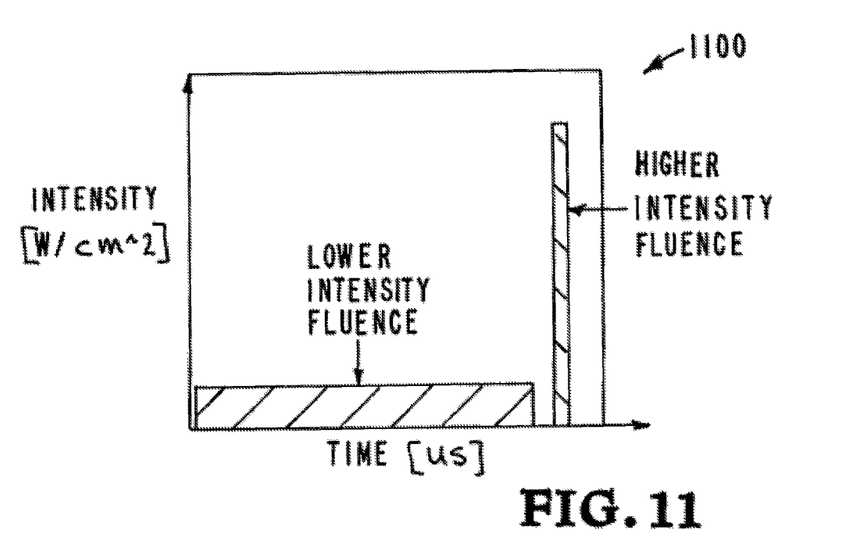
FIG. 11 is a graph illustrating yet another embodiment of the inventor's additive manufacturing apparatus, systems, and methods from a temporal perspective.

Referring now to FIG. 11 a graph illustrates yet another embodiment of the inventor's additive manufacturing apparatus, systems, and methods. The graph is designated generally by the reference numeral 1100. The inventor's additive manufacturing apparatus, systems, and methods use a temporally modulated laser beam to selectively fuse a layer of powder. The graph 1100 illustrates the inventors' system from a temporal perspective where the pulses in superposition are non-overlapped.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing method of producing a product, comprising the steps of:
   providing a substrate having an interface layer,
   providing first additive manufacturing powder particles,
   creating a first layer of said first additive manufacturing powder particles by positioning said first additive manufacturing powder particles on said substrate, said first layer of said first additive manufacturing powder particles on said substrate producing a first interface layer portion adjacent to said interface layer of said substrate,
   producing a first data file defining a planar cross section of a first layer of the product,
   directing laser energy from a first laser beam, which is representative of said first data file, towards a mask,
   controlling the mask to operate as a selective area mask that is transparent to a first portion of said laser energy while rejecting a second portion of said laser energy, and therefore to create a pattern in accordance with said first data file,
   directing said laser energy using a first power level onto said first layer,
   melting said first layer of said first additive manufacturing powder particles using said first power level, wherein said first layer of said first additive manufacturing powder particles has surface tension forces and, using said laser energy at a second power level greater than said first power level to melt said interface layer of said substrate,
   further using said laser energy at said second power level to fully melt said first interface layer portion of said first additive manufacturing powder particles adjacent to said interface layer, before said surface tension forces of said first additive manufacturing powder particles distort said first layer of said first additive manufacturing powder particles, thereby bonding said first layer of said first additive manufacturing powder particles to said substrate,
   positioning a second layer of additive manufacturing powder particles on said first layer of the product, the second layer of additive manufacturing particles including a second interface layer portion,
   producing a second data file defining a planar cross section of a second layer of the product,
   using a second laser to produce a second laser beam having a portion containing said second data file,
   using said mask that is transparent to said portion of said second laser beam containing said second data file,
   directing said second laser beam having said portion containing said second data file onto said second layer of additive manufacturing powder particles to bond said second layer of additive manufacturing powder particles to an additional interface layer portion of said first layer of the product,
   using said pulsed second laser beam at the first power level,
   directing said second laser beam having said portion containing said second data file, at the first power level, onto said second layer of additive manufacturing powder particles to form said second layer of the product,
   directing the second laser beam at the second power level to fully melt the additional interface layer portion of said first layer and the second interface layer portion of the second layer of additive manufacturing powder particles before surface tension distorts the powder particles of the second layer of additive manufacturing powder particles, to form the second layer of the product, and
   repeating said steps to form additional layers of the product and produce the product.

2. The additive manufacturing method of producing a product of claim 1 wherein said step of providing a first laser beam having a portion containing said first data file comprises providing a pulsed laser that produces a bonding pulsed laser beam having a portion containing said first data file.

3. The additive manufacturing method of producing a product of claim 1 wherein said step of directing said first laser beam containing said data file onto said first layer of additive manufacturing powder particles on said substrate directs said data file onto said first layer of additive manufacturing powder particles on said substrate in a single shot.

4. The additive manufacturing method of producing a product of claim 1 wherein said step of directing said first laser beam comprises directing a first laser beam with a predetermined power and duration that said first laser beam melts said additive manufacturing powder particles or said substrate, or both said additive manufacturing powder particles and said substrate only at said interface layer portion.

5. The additive manufacturing method of producing a product of claim 1 wherein said step of directing laser energy from a first laser beam comprises providing a pulsed first laser that produces a bonding pulsed laser beam having a pulse that is milliseconds in duration.

6. The additive manufacturing method of producing a product of claim 1 wherein said step of providing a first laser that produces a first laser beam having a portion containing said first data file comprises providing a pulsed first laser that produces a melting pulsed laser beam having a portion containing said first data file.

7. An additive manufacturing method of producing a product, comprising the steps of:
   providing a substrate which forms a first layer of the product, the substrate having an interface layer portion,
   providing an additional quantity of powder particles,
   creating an additional layer of the product using said additional quantity of powder particles by:

positioning said additional quantity of powder particles on said substrate, said additional layer producing a first interface between said additional layer and said substrate, directing laser energy patterned to create said additional layer of said product onto said additional quantity of powder particles, using a first portion of said laser energy to at least initiate heating of said additional quantity of powder particles, wherein said additional quantity of powder particles experiences surface tension forces as melting begins to occur, relative to said interface layer portion of said substrate; and using a second portion of said laser energy, which is greater in intensity than said first portion of said laser energy, to melt both said first interface and said interface layer portion of said substrate, before at least a portion of said additional quantity of said powder particles of said additional layer are fully melted and become distorted by the surface tension forces and caused to agglomerate.

8. The method of claim 7, wherein said second portion of said laser energy is applied over a shorter duration than said first portion of said laser energy.

9. The method of claim 8, wherein said second portion of said laser energy is applied over a duration comprising microseconds.

10. The method of claim 8, wherein said second portion of said laser energy is applied over a duration comprising nanoseconds.

11. The method of claim 8, wherein said first portion of said laser energy is applied over a duration of milliseconds.

12. The method of claim 7, wherein directing laser energy patterned to create said additional layer of said product onto said additional quantity of powder particles comprises using a mask to create said patterned laser energy.

13. The method of claim 12, wherein using the mask to create said patterned laser energy comprises controlling an optically addressable light valve to create the patterned laser energy.

14. The method of claim 12, wherein using the mask comprises controlling a liquid crystal polarization rotator comprising a liquid crystal display (LCD) positioned upstream of a polarizing element, relative to a direction of travel of the laser energy.

15. The method of claim 14, wherein controlling the mask further comprises independently controlling pixels of the liquid crystal display to change a plurality of a first group of incoming photons of the laser energy directed at the mask, while allowing a plurality of a second group of incoming photons of the laser energy to remain unchanged, and then using the polarizing element to reject one of the first or second groups of incoming photons to create the patterned laser energy.

16. The method of claim 15, wherein controlling the mask comprises using an independent polarizing element comprising a polarizing mirror to reject one of the first or second groups of photons, to thus form the patterned laser energy.

17. The method of claim 12, wherein directing laser energy patterned to create said additional layer of said product comprises directing the laser energy through a metal mask which blocks portions of the laser energy while allowing other portions of the laser energy to pass therethrough, to thus form the patterned laser energy.

18. An additive manufacturing method of producing a product, comprising the steps of:

providing a substrate which forms a first layer of the product, the substrate having an interface layer portion, providing an additional quantity of powder particles, creating an additional layer of the product using said additional quantity of powder particles by:

positioning said additional quantity of powder particles on said substrate, said additional quantity producing a first interface between said additional layer and said substrate, generating laser energy;

using a mask to pattern the laser energy to create patterned laser energy representative of a two dimensional data file, wherein the two dimensional data file represents the additional layer of the product;

using the patterned laser energy to initiate heating of said additional quantity of powder particles using a first power level, wherein said additional quantity of powder particles experiences surface tension forces as melting begins to occur, relative to said interface layer portion of said substrate;

increasing said patterned laser energy to a second power level to melt both said first interface and said interface layer portion of said substrate and the interface of said substrate, before at least a portion of said powder particles of said additional layer of powder particles are fully melted and become distorted by the surface tension forces and caused to agglomerate; and continuing to use the patterned laser energy as needed to fully melt the additional quantity of powder particles of the additional layer to form the additional layer of the product.

19. The method of claim 18, wherein the second power level is applied for a shorter time duration than the first power level.

20. The method of claim 18, wherein:

the second power level is applied for at least one of microseconds or nanoseconds; and the first power level is applied for microseconds.

21. The method of claim 18, wherein:

the first power level is comprises laser energy on an order of kilowatts of power; and the second power level comprises laser energy on an order of milli-Joules to Joules of energy.

* * * * *